United States Patent Office 2,827,177
Patented Mar. 18, 1958

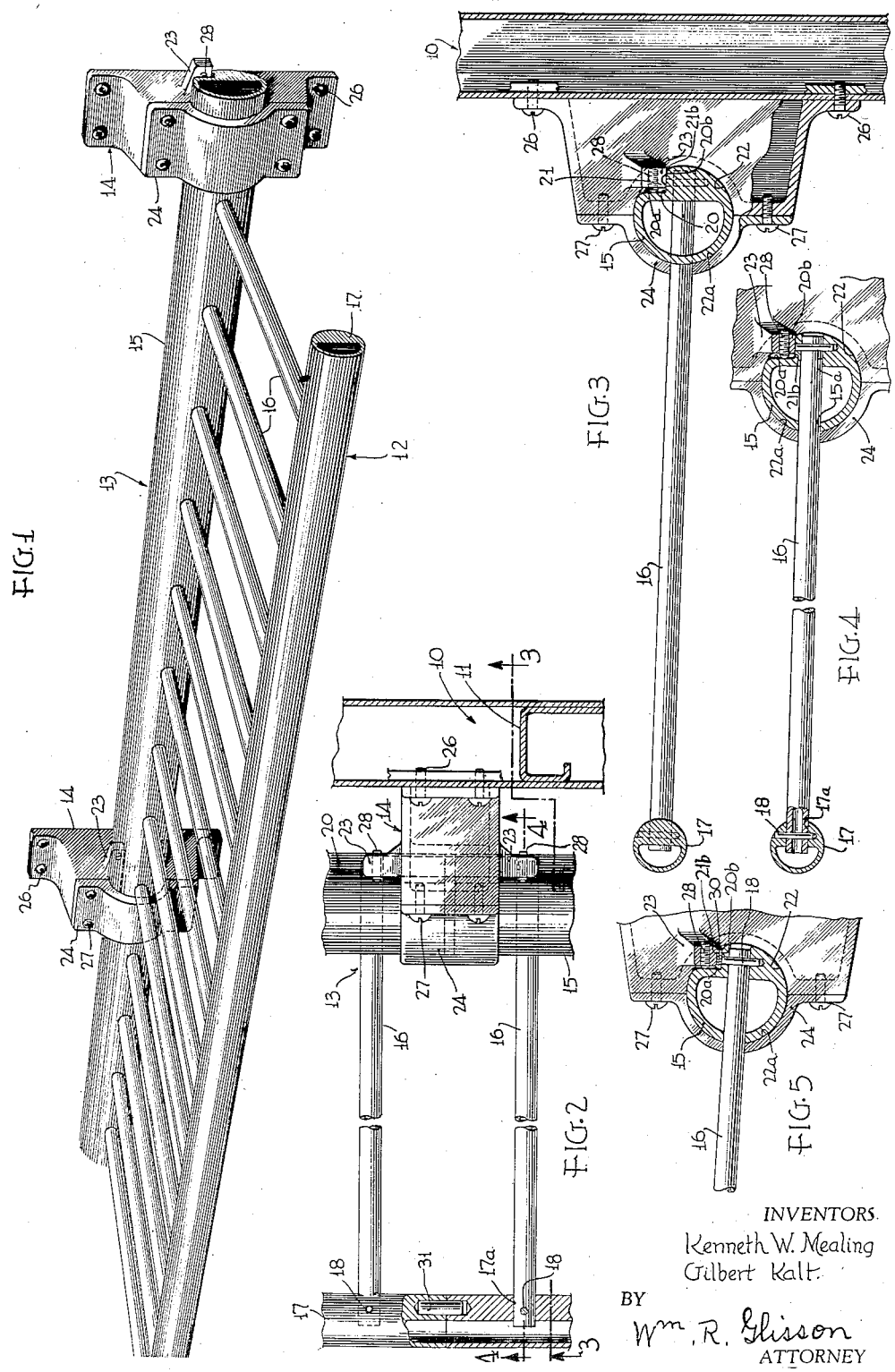

2,827,177

RACK OR SHELF, AS FOR PASSENGER VEHICLES

Kenneth W. Mealing, Warrington, and Gilbert Kalt, Philadelphia, Pa., assignors to The Budd Company, Philadelphia, Pa., a corporation of Pennsylvania Application August 2, 1955, Serial No. 525,908

4 Claims. (Cl. 211—90)

This invention relates to a rack or shelf, specifically to a baggage rack for passenger vehicles, and has for an object the provision of improvements in this art.

One of the particular objects of the invention is to provide a rack which is attractive in appearance and easily cleaned.

Another object is to provide a rack which is free from transverse obstructions so as to be available for use throughout its length.

Another object is to provide a rack which is strong and free from noise.

Another object is to provide a rack which can largely be built in the shop or "on the bench" in quantity ready for assembly and which requires the minimum of work in installing it in a vehicle.

Another object is to provide a rack which can readily have the height of its outer edge adjusted.

Another object is to provide a rack which is simple and inexpensive.

The above and other objects and advantages of the invention will be apparent from the following description of an illustrative embodiment, reference being made to the accompanying drawings, wherein:

Fig. 1 is a perspective elevation of a portion of a baggage rack of the present invention as installed in a vehicle;

Fig. 2 is an enlarged plan view, partly in section, of a short portion of the rack at a support bracket;

Fig. 3 is an enlarged vertical section taken on the line 3—3 of Fig. 2;

Fig. 4 is an enlarged section taken on the line 4—4 of Fig. 2; and

Fig. 5 is an enlarged vertical section, like part of Fig. 4, showing how the height of the outer edge of the rack is adjusted.

As shown in the drawings, a vehicle side wall 10 with spaced studs 11 is provided on the side above the windows with a shelf or baggage rack 12.

The rack 12 comprises a rack proper 13 and a plurality of brackets 14 spaced along the length of the vehicle and preferably located where good support can be found in the framing behind the interior lining.

The rack proper is preferably made in the shop or "on the bench" in a plurality of standard lengths which can be installed end-to-end along the length of the car, an end length being cut if necessary to fit the end wall of the car.

The rack resembles a ladder in form and comprises a heavy torque tube rail 15, a plurality of cross bars or rungs 16, and a lighter aisle-side rail 17. All of the parts can be made as extruded tubes of the desired cross section and can be of a light strong material such as aluminum or the like. The torque rails 15 are preferably of circular sectional form exteriorly and having a D-shaped or parti-circular sectional shape interiorly, leaving heavy solid material on one side. Holes 15a and 17a are provided in the rails 15 and 17 for the ends of the rungs 16 and after the rungs have been inserted in the holes they are secured as by spring locking pins ("roll-pins") 18 driven in holes in the rails and rungs which are disposed transversely to the holes for the rungs. The holes for the pins 18 are made from the upper side and for neat appearance preferably do not pass through the lower surface of the rails.

The heavy outer-wall-supported torque rail 15 is notched on the upper side, as at 20, and this notch embraces a rib or spline 21 formed on the interior parti-cylindrical surface 22 of the main or base portion of the bracket 14. The rib 21 continues on the sides of the bracket, beyond the ends of the tube-receiving opening, onto lugs 23 which are integrally formed on the bracket.

The bracket 14 includes a cap 24 having a parti-cylindrical surface 22a formed as a complement to the parti-cylindrical surface 22 of the bracket base.

The bracket base is secured to the vehicle side wall by suitable means, such as screws 26, and the cap 24 is secured on the base by screws 27. Adjustment locking screws 28 are provided in the lugs 23 and after the cap has been secured on the base but before it has been tightly clamped on the torque rail 15, the screws 28 are tightened against the vertical surface 20a of the notch 20 of the torque rail to bring the lower surface 20b tightly up against the lower surface 21b of the spline 21 of the bracket. If the elevation of the aisle edge of the rack at the rail 17 is too low, one or more shims 30 (Fig. 5) are placed between the surfaces 20b and 21b before the screws 28 are tightened. After proper adjustment has been obtained, the cap screws 27 are fully tightened to clamp torque rail securely in the bracket.

This construction provides that the heavy bracket-secured torque rail 15 will carry the load on the rack into the brackets and wall and the rungs all act as cantilever beams based on the torque tube 15 to support the load.

Where one section of the rack is joined to another, the rail sections 17 may be connected by a dowel pin 31 (Fig. 2) which is driven into mating holes in the rail parts. The sections of the torque rail 15 for two adjacent lengths are shown as both clamped in a bracket. If desired, D-shaped dowels may be fitted in the interior openings of both rails and may be retained by transverse spring pins driven in suitable holes formed in the rails and dowels. When such interior connections are used, the exterior is left smooth and the joint locations are hardly noticeable. When D-shaped dowels are used, it is not necessary to have the torque rail joint located at a bracket.

The rack hereby provided is usable for baggage throughout its full length since it is free from the partitioning effect of full-width spaced brackets found in many types of baggage racks.

It is thus seen that the invention provides a sturdy, commodious, attractive baggage rack which is simple and inexpensive and easily installed. There is practically no work to do in the vehicle except to anchor the brackets to the wall and secure the rack in place. Even if a length of rack strip has to be cut, this can be done in the shop from measurements taken in the vehicle. Most previous types of racks have required much work to be done within the vehicle which is awkward and expensive and greatly interferes with other work which must be done within the car.

While one embodiment has been described in detail for purposes of illustration, it is to be understood that there may be other embodiments and modifications within the general scope of the invention.

What is claimed is:

1. A baggage rack for vehicles comprising in combination, a ladder-like subassembly formed of a longitudinal torque rail and a parallel second rail spaced therefrom with spaced rung-like transverse bars secured to the rails and forming a rigid frame therewith, longitudinally spaced brackets adapted to be secured to the vehicle wall, and means on said brackets for holding said torque rail against turning at the brackets so as to carry the frame subassembly wholly by said torque rail, said holding means on the brackets comprising interior splines engaging in a notch in said torque rail, and adjusting clamp screws threaded in said splines and engaging a side of the notch.

2. A vehicle baggage rack comprising in combination, a ladder-like subassembly formed of a relatively large tubular torque rail, a relatively small tubular inner rail and a plurality of tubular cross bars rigidly connected to said rails, said rails being provided in section with D-shaped interior spaces leaving a thick portion on one side and holes in which said bars are located, pins in the thick portions of said rails and in said bars for securing the bars in the rails, brackets adapted to be secured to the vehicle wall, and coacting means on said brackets and torque rail for holding said torque rail in place and against turning, said holding means including mating splined parts and a clamp screw threaded in the bracket and engaging an abutment on the torque rail and a clamp cap on each bracket.

3. A vehicle baggage rack comprising in combination, a ladder-like subassembly formed of a relatively large tubular torque rail, a relatively small tubular inner rail and a plurality of tubular cross bars rigidly connected to said rails, said rails being provided in section with D-shaped interior spaces leaving a thick portion on one side and holes in which said bars are located, pins in the thick portions of said rails and in said bars for securing the bars in the rails, brackets adapted to be secured to the vehicle wall, and means on said brackets for holding said torque rail in place and against turning, said holding means including an angular groove in said torque rail and an angular spline on a bracket entering said groove, and a screw threaded in said spline engaging one face of the groove to force the other face of the groove against a side of the spline, and a cap on the bracket to clamp the torque rail in position.

4. A baggage rack as set forth in claim 3, wherein said spline on a bracket extends as a projection from at least one side and wherein said screw is threaded in the spline projection.

References Cited in the file of this patent

UNITED STATES PATENTS

| | | |
|---|---|---|
| 123,122 | Palmenberg | Jan. 30, 1872 |
| 927,235 | Hamm | July 6, 1909 |
| 2,042,517 | Ellis | June 2, 1936 |
| 2,062,360 | Goulooze | Dec. 1, 1936 |
| 2,189,538 | Van Pelt | Feb. 6, 1940 |
| 2,296,487 | Alfred | Sept. 22, 1942 |
| 2,639,817 | Ehret | May 26, 1953 |
| 2,698,093 | Barnes | Dec. 28, 1954 |

FOREIGN PATENTS

| | | |
|---|---|---|
| 459,724 | Great Britain | Jan. 13, 1937 |